April 14, 1964  H. E. HAGY  3,129,087
APPARATUS FOR CONTROLLED HEAT TREATMENT OF GLASS
Filed May 15, 1961
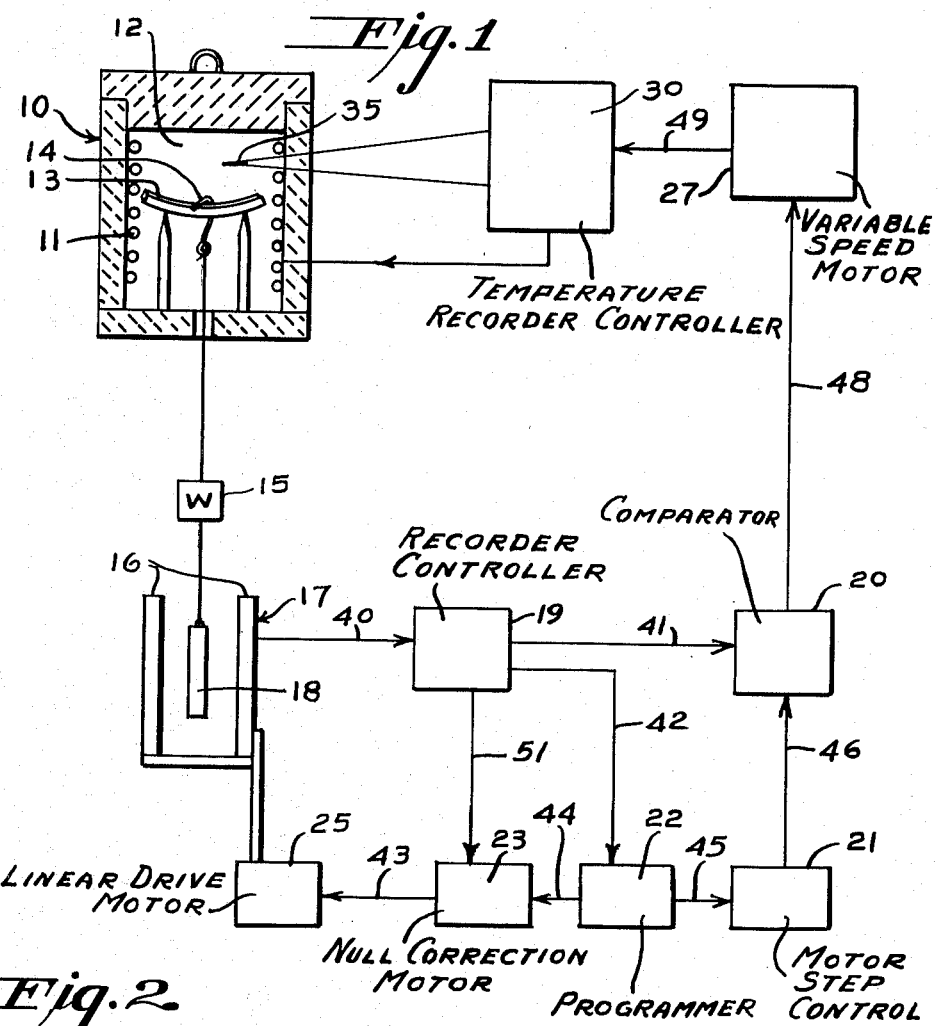
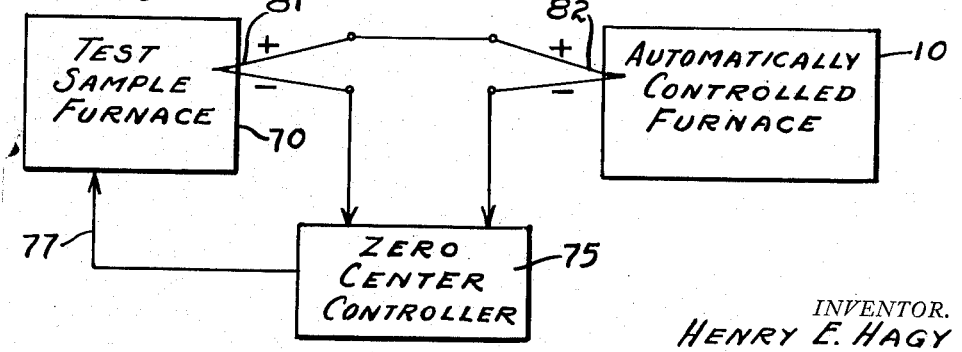
INVENTOR.
HENRY E. HAGY
BY Clarence R. Patty, Jr.
ATTORNEY United States Patent Office 3,129,087
Patented Apr. 14, 1964

3,129,087
APPARATUS FOR CONTROLLED HEAT
TREATMENT OF GLASS
Henry E. Hagy, Corning, N.Y., assignor to Corning Glass
Works, Corning, N.Y., a corporation of New York
Filed May 15, 1961, Ser. No. 110,111
3 Claims. (Cl. 65—162)

The present invention relates to an improvement in methods for producing ceramic materials from glasses by the process of controlled heat treatment. In particular, the invention relates to the addition of a novel viscosity control during a portion of the manufacturing operation.

Semicrystalline bodies, which term is used herein to refer to glassy substances which have been transformed into semicrystalline materials by a process of controlled heat treatment similar to the method disclosed in U.S. Patent 2,920,971, issued to S. D. Stookey and assigned to the assignee of the present invention, have been found to have great value in numerous commercial applications. Their production has sometimes presented problems due to the degree of precision required in regulating the parameters involved in the process whereby such substances are produced. In addition, difficulty in determining and regulating such parameters has added substantially to the problems inherent in experimentation with new compositions for such semicrystalline bodies.

As is well known to those working with such materials, in producing finished articles of semicrystalline bodies there is ever present the problem of maintaining the materials at the instantaneous temperatures which are optimum for the formation of the desired crystalline phases and at the same time are such as to prevent sagging and other deformation of the articles.

In order to prevent the deformation of such articles during production, the viscosities thereof must be maintained at values high enough to minimize flow; at the same time viscosities must be kept low enough to permit crystallization to proceed uniformly and thereby to prevent spontaneous breakage, which results when abrupt crystalline development causes large density changes, producing stresses which result in fracture when viscosities are too high to permit stress relief.

The determination of the optimum temperature cycles for varying compositions has in the past been by the slow process of trial and error. The Stookey patent discloses that the optimum heating schedule may be estimated by observing the total deformation of a beam, and, if this amount is unsatisfactory, changing the schedule until the satisfactory deformation is achieved. The present improvement on the Stookey process completely eliminates this wasted time and gives a precise temperature schedule with the first sample.

It is generally possible for persons familiar with the art relating to semicrystalline bodies to estimate the approximate viscosities which are optimum for the formation of the desired crystalline phases in glassy matrices. Due to the fact that such materials during the process of crystallization have viscosities which depend not only upon their temperatures but also upon the length of time that such substances are maintained at each temperature, it has not been possible to control viscosity by means of a simple temperature-viscosity relationship.

Accordingly, it is an object of the present invention to provide a novel method for easily and quickly determining the optimum temperature cycle necessary to maintain viscosity at a desired value for a time interval during the production of semicrystalline bodies by the method of controlled heat treatment.

It is a further object to provide a novel method for controlling viscosity during the production of semicrystalline bodies.

It is also an object to provide a novel apparatus for effecting these results.

In accordance with the above objects, the present invention is an improvement in the process for producing semicrystalline bodies by controlled heat treatment which improvement comprises the addition to the process of a viscosity control during the crystallizing operation whereby the temperatures of samples of such glasses under stress are maintained at values which result in rates of deflection which indicate viscosities within a range known to be suitable for crystallization.

The invention can best be understood by reference to the accompanying drawing wherein:

FIG. 1 illustrates schematically one form of furnace and control circuit for use in determining the temperature curve to be used as an improvement in the process for making semicrystalline bodies, and FIG. 2 illustrates schematically a two-furnace system for producing samples of semicrystalline bodies for testing at various stages of ceramming.

FIG. 1 illustrates a furnace 10, shown in vertical section, heated by means of resistance heating element 11. Within chamber 12 supported at its ends is a beam of glass 13, the optimum ceramming temperature schedule of which is to be determined. Hanging from a hook 14, supported at the center of glass beam 13 is a weight 15.

It is well known that when a rectangular beam of appropriate viscosity is supported at its ends and a weight is hung from its center, the center will be drawn downward as a consequence of viscous flow, subsequent to any initial elastic deformation, at a rate which is constant for small magnitudes of deflection and for any given viscosity, according to the formula:

$$R = \frac{mgd^3}{12wt^3v}$$

where $m$ is the applied load, $g$ is the acceleration of gravity, $d$ is the distance between the two points of support, $w$ is the width of the beam, $t$ is the thickness of the beam, and $v$ is the viscosity of the beam. Conversely, it is observed that for any given system a constant rate of deflection indicates a constant viscosity.

This observation is utilized in the present control system to determine the optimum temperature schedule to be used in ceramming and also as a method for quickly and conveniently producing for analysis samples of semicrystalline bodies of new compositions.

Since the viscosity of glass or any given composition during the process of crystallization is not dependent solely upon temperature, as is the case with most other substances, it cannot be maintained constant by holding the glass at a constant temperature. As crystallization proceeds at any given temperature, the viscosity of the glass increases, and, in order to maintain the glass at a constant viscosity, the temperature must be increased.

The control system illustrated in FIGURE 1 determines the optimum temperature cycle as follows:

The above formula is applied to determine the rate of deflection corresponding to the desired viscosity, which is generally somewhere between $10^{10}$ and $10^{13}$ poises. The coils 16 of a linear variable differential transformer 17 are placed below the beam and outside the furnace and are driven downward by linear drive motor 25 at the same rate as the rate of deflection calculated for a beam of a desired viscosity. The core 18 of transformer 17 is suspended from weight 15 and consequently moves downward at the same rate as the rate of deflection of the center point of beam 13.

Initially core 18 is centered vertically at a null position between coils 16, and no signal is emitted from the transformer. As long as the core descends at a rate identical with the rate of the driven coils, no signal is emitted; however, as soon as the beam begins to deflect at a rate other than that calculated to correspond with the desired viscosity, transformer 17 is thrown off balance, and signal 40 is sent to error signal recorder-controller 19, which is a standard item and can be purchased, for example, from the Minneapolis Honeywell Company. Recorder-controller 19 emits signal 41, which is proportional to signal 40. Signal 41 is fed into comparator 20.

In order to prevent core 18 from moving outside the range of coils 16 and to prevent error signal 40 from exceeding full scale of recorder-controller 19, recorder-contoller 19 is supplied with limit switches. When the core is displaced either up or down by a predetermined distance, a limit switch closes, and signal 42 is sent to programmer 22, which is made up of a number of conventional relays operated by the limit switches. A relay in programmer 22 is closed, which in turn, by means of signal 44, closes the circuit between recorder-controller 19 and null correction motor 23. The closing of the circuit directs signal 51, which has a voltage proportional to error signal 40, into null correction motor 23. This motor in turn throws linear drive motor 25 out of gear and itself operates to shift coils 16 back to a null position, which is that position at which no error signal is emitted from transformer 17.

Since this re-nulling operation results in a zero error signal 40 from the transformer 17, signal 41 entering comparator 20 also becomes zero. This signal, indicating a zero error, is no longer representative of the change in the viscosity of beam 13, since it has been returned to zero as the result of factors independent of viscosity. Hence, in order that the signal which finally regulates the temperature in chamber 12 be unchanged due to this mechanical re-nulling, it is necessary that a signal be added to signal 41, this additional signal compensating for the magnitude of the adjustment imposed by the re-nulling. It is the function of comparator 20, which is a conventional amplifier-rectifier, to effect this addition.

Accordingly, signal 46, which is the signal added to signal 41 by comparator 20, is produced as follows: When programmer 22 receives signal 42, it not only starts the re-nulling operation, but it also sends signal 45 to motor step control 21, which is a stepping switch which is activated by signal 45 and which moves to a position such that it emits a new signal 46 which is altered by a change in voltage of the same magnitude but of opposite sign as the adjustment in signal 41 due to the re-nulling operation. Hence, comparator 20 receives the same total input voltage as it received before the re-nulling. The stepping switch is moved each time transformer 17 is re-nulled, either adding to or subtracting from the voltage of signal 46 to balance the respective losses or gains by signal 41 caused by re-nulling.

The result of the addition of signals 41 and 46 by comparator 20 is that the output signal 48 of the comparator always represents the error that transformer 17 would measure had the re-nulling operation not been necessary. Hence, the signal 48 which reaches variable speed motor 27 is affected only by changes in viscosity and not by externally imposed adjustments.

Signal 48 from comparator 20 is fed into variable speed motor 27, which in turn drives the temperature control point in temperature recorder-controller 30, which is a Leeds and Northrup Speedomax type G temperature controller equipped with current adjusting type power control and magnetic amplifier, and which varies the current in heating coil 11. The temperature within chamber 12 is sensed by thermocouple 35 and is recorded by temperature recorder-controller 30.

It will be apparent from the description that viscosity control determined in the general manner above-described is applicable to the process for producing semicrystalline bodies in several ways.

When it is desired to test the properties of a new semicrystalline bodies composition, a sample of such glass is provided and cerammed in the furnace illustrated in FIG. 1.

Temperature recorder-controller 30 in addition to controlling the temperature in chamber 12 also records these temperature variations versus time, and this record can be utilized in setting up temperature gradients in a conventional lehr of the type used in annealing operations, wherein articles pass on a conveyor through an enclosure having a temperature-controlled atmosphere. In this case the lehr is divided into zones of differing temperature so that the continuously moving glass articles are subjected to variations in temperature as they move continuously through the lehr, thereby obviating the difficulties inherent in attempting to effect rapid temperature changes throughout a large furnace.

When it is desired to remove samples of glass at different stages in the ceramming operation without disturbing the control system of FIG. 1, a second furnace may be provided as in FIG. 2. Here furnace 10 is identical to the furnace of FIG. 1 and is provided with the same viscosity control system. Furnace 70 contains a number of samples of a glass composition the properties of which are to be tested at varying stages during crystallizing. The furnaces are provided with thermocouples 81 and 82 having their positive elements connected in opposition as shown and their negative elements connected to the respective input terminals of zero center controller 75. A difference of temperature in the two furnaces sets up a potential, which is amplified by controller 75 and provides the power input for controlling the temperature of test-sample furnace 70 as indicated by signal 77.

It should be noted that stresses other than bending moments may be employed to indicate viscosity. For example, the rate of elongation of a fiber under tension or the rate of torsion in a sample subjected to a constant torque may be regulated according to the present invention. In addition, beams having cross sections of other than rectangular form may be used.

The present invention comprises a refinement and improvement in processes for forming semicrystalline bodies by controlled heat treatment, and as such it is not to be limited by the precise apparatus used but rather by the scope of the appended claims.

What is claimed is:

1. Apparatus for maintaining an object of glass at a viscosity of substantially constant value during crystallization comprising means for indicating the rate of deformation of said glass under an applied stress and for providing a signal indicating variations between said indicated rate of deformation and a predetermined standard rate, and means responsive to said signal for regulating the temperature of said glass object to restore its viscosity to said value and thereby produce a rate of deformation identical with said predetermined standard rate.

2. Apparatus for maintaining an object of glass at a constant viscosity during crystallization comprising means for applying a constant stress to said object to produce a continuous rate of deformation thereof, first means moving with a rate indicating said rate of deformation, second means moving with a predetermined standard rate, means for comparing the relative positions of said first and second means and for emitting a signal indicative of relative displacement from a null position, and means responsive to said signal for regulating the temperature of said object.

3. Apparatus for maintaining an object of glass at a constant viscosity during crystallization comprising means for applying a constant stress to said object to produce a continuous rate of deformation thereof, first means moving with a rate indicating said rate of deformation, second means movable with a predetermined standard rate, means for moving said second means with said predetermined standard rate, means for comparing the relative positions of said first and second means and for emitting a first signal indicative of relative displacement from a null position, means for returning said first and second means to said null position when said relative displacement reaches a predetermined magnitude, means for providing a second signal having a magnitude equal and opposite to the cumulative adjustment of said first signal resulting from the returning of said first and second means to said null position, means for adding said first and second signals and for emitting a third signal proportional to the sum thereof, and means responsive to said third signal for regulating the temperature of said object.

References Cited in the file of this patent

UNITED STATES PATENTS

| | | | |
|---|---|---|---|
| 1,913,580 | Altshuler et al. | June 13, | 1933 |
| 2,231,723 | Jung et al. | Feb. 11, | 1941 |
| 2,655,550 | Zvanut | Oct. 13, | 1953 |
| 2,920,971 | Stookey | Jan. 12, | 1960 |
| 2,960,802 | Voss | Nov. 22, | 1960 |
| 2,968,723 | Steigerwald | Jan. 17, | 1961 |